(12) United States Patent
Vodopia

(10) Patent No.: US 9,916,568 B2
(45) Date of Patent: *Mar. 13, 2018

(54) CACHING ITEM INFORMATION IN A CLOUD-BASED POINT OF SALE SYSTEM

(71) Applicant: Toshiba Global Commerce Solutions Holdings Corporation, Tokyo (JP)

(72) Inventor: Andrew D. Vodopia, Durham, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 306 days.

This patent is subject to a terminal disclaimer.

(21) Appl. No.: 14/641,624

(22) Filed: Mar. 9, 2015

(65) Prior Publication Data
US 2015/0178705 A1 Jun. 25, 2015

Related U.S. Application Data

(63) Continuation of application No. 13/311,814, filed on Dec. 6, 2011, now Pat. No. 8,977,561.

(51) Int. Cl.
*G06Q 20/20* (2012.01)
*G07G 1/00* (2006.01)
(Continued)

(52) U.S. Cl.
CPC .......... *G06Q 20/20* (2013.01); *G06Q 20/202* (2013.01); *G06Q 20/38* (2013.01); *G06Q 30/02* (2013.01);
(Continued)

(58) Field of Classification Search
None
See application file for complete search history.

(56) References Cited

U.S. PATENT DOCUMENTS 5,497,314 A * 3/1996 Novak .................... A47F 9/046
235/383
5,649,070 A 7/1997 Connell et al.
(Continued)

FOREIGN PATENT DOCUMENTS

EP 0140302 A2 5/1985

OTHER PUBLICATIONS

U.S. Appl. No. 13/311,814.
(Continued)

*Primary Examiner* — Paul Danneman
(74) *Attorney, Agent, or Firm* — Stephen J. Walder, Jr.

(57) ABSTRACT

Mechanisms are provided, in a data processing system, for retrieving and utilizing item information to perform a transaction. The mechanisms receive an identification of an item present in a detection field of the item identification system. A determination is made as to whether valid item information for the item is present in a cache of the data processing system in response to detecting the item as being present in the detection field of the item identification system. If valid item information is present in the cache, the valid item information is retrieved from the cache. If valid item information is not present in the cache, the valid item information is retrieved from a remotely located cloud computing system. The transaction is performed based on the valid item information.

16 Claims, 3 Drawing Sheets

(51) Int. Cl.
*G06Q 30/06* (2012.01)
*G06Q 30/02* (2012.01)
*G06Q 20/38* (2012.01)
*H04L 29/08* (2006.01)

(52) U.S. Cl.
CPC .......... *G06Q 30/06* (2013.01); *G07G 1/0045* (2013.01); *H04L 67/2842* (2013.01)

(56) References Cited

U.S. PATENT DOCUMENTS

| | | |
|---|---|---|
| 6,934,717 B1 | 8/2005 | James |
| 7,403,907 B1 | 7/2008 | Gerken, III et al. |
| 8,401,911 B1 | 3/2013 | Chu et al. |
| 2008/0319967 A1* | 12/2008 | Hutchison ......... G06F 17/30545 |
| 2009/0101713 A1 | 4/2009 | Ulrich et al. |
| 2010/0217678 A1 | 8/2010 | Goncalves |
| 2010/0306256 A1* | 12/2010 | Blackman ........... G06F 12/0804 707/770 |
| 2013/0144736 A1 | 6/2013 | Vodopia |

OTHER PUBLICATIONS

Thadani, Prakash, "Local Caching Architecture for RFID Tag Resolution", Thesis, Wichita State University, http://soar.wichita.edu, Dec. 2007, 165 pages.

* cited by examiner

CACHING ITEM INFORMATION IN A CLOUD-BASED POINT OF SALE SYSTEM

This application is a continuation of application Ser. No. 13/311,814, filed Dec. 6, 2011, status allowed.

BACKGROUND

The present application relates generally to an improved data processing apparatus and method and more specifically to mechanisms for caching item information in a cloud-based point of sale system.

Recent technology has trended towards the use of cloud-based computing systems. Cloud computing refers to the delivery of computing as a service rather than a product, whereby shared resources, software, and information are provided to computers and other devices as a utility (similar to an electricity grid) over a network (typically the Internet). Cloud encompasses computing technologies that provide computation, software, data access, and storage services that do not require end-user knowledge of the physical location and configuration of the system that delivers the services. Cloud computing providers deliver applications via a network, such as the Internet, which are accessed from web browsers and desktop and mobile apps, while the business software and data are stored on servers at a remote location. Most cloud computing infrastructures consist of services delivered through shared data-centers and appearing as a single point of access for consumers' computing needs. Commercial offerings may be required to meet service-level agreements (SLAs), but specific terms are less often negotiated by smaller companies. The collection of servers, storage systems, and the like that provide these services to client computing devices is referred to generally as "the cloud."

SUMMARY

In one illustrative embodiment, a method, in a data processing system, is provided for retrieving and utilizing item information to perform a transaction. The method comprises receiving, by the data processing system, an identification of an item present in a detection field of the item identification system. The method further comprises determining, by the data processing system, if valid item information for the item is present in a cache of the data processing system in response to detecting the item as being present in the detection field of the item identification system. In addition, the method comprises retrieving, by the data processing system, the valid item information from the cache in response to the valid item information for the item being determined to be present in the cache of the data processing system. Moreover, the method comprises retrieving, by the data processing system, the valid item information from a remotely located cloud computing system in response to a determination that valid item information is not present in the cache. In addition, the method comprises performing, by the data processing system, the transaction based on the valid item information.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
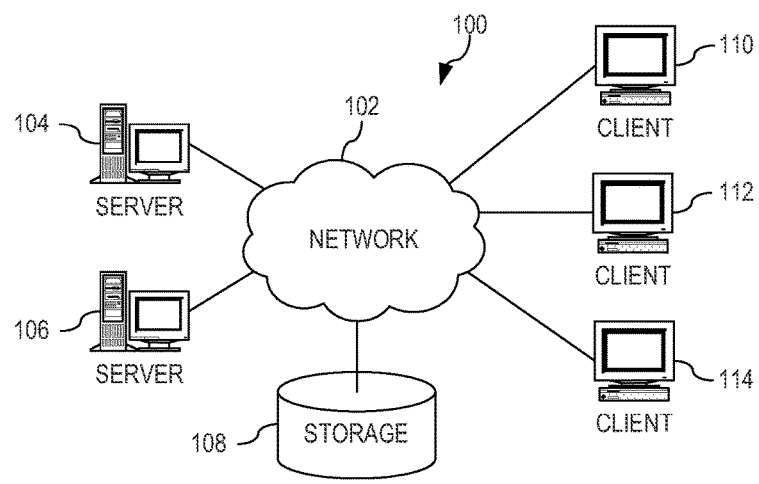
FIG. 1 is an example block diagram of a distributed data processing system in which aspects of the illustrative embodiments may be implemented.

In accordance with the illustrative embodiments, point of sale systems may make use of the cloud computing model to store and access item information, such as item prices, descriptions, images, discount information, coupons, and the like. While this will allow synchronization of item information with computing systems/devices of a business organization, cloud computing may pose an adverse effect on performance as it will take time for the item information to be downloaded from the servers, storage systems, and the like, of the cloud computing system. This time for retrieval of item information from the cloud computing system may be noticeable and unacceptable in intense, high volume commercial environments, such as grocery stores, shopping warehouse stores, "big-box" stores, and the like. Performance concerns such as network bandwidth and storage space on the point-of-sale (POS) terminal will also prevent the entire catalog of item information from being synchronized at the beginning of a transaction.

To address such concerns, the illustrative embodiments provide a mechanism for caching item information in a cloud-based POS system so that this item information may be utilized with minimal delay, thereby allowing cloud-based POS systems to be utilized in intense, high-volume shopping environments. With the mechanisms of the illustrative embodiments item information for products that are offered for sale by a business organization is stored in a cloud-based computing system and may be updated within this cloud-based computing system for distribution to one or more business locations of the business organization. The item information may be stored in a distributed fashion over one or more storage systems, server systems, or the like, that together constitute "the cloud" in which the item information is stored. Client computing systems/devices at the various business locations may access this item information from the cloud when needed. In this way, these client computing systems/devices may be given access to the most recent item information by updating this item information in the cloud and allowing client computing systems/devices to access this item information remotely from the cloud.

At the particular business location, an item identification system is utilized to identify the presence of an item for sale. More specifically, the item identification system is configured to detect items for sale that a customer has selected for purchase by being placed in close proximity to a location where such items for sale are placed in preparation for a transaction between the business location and the customer that selected the item for purchase. In one illustrative embodiment, the item identification system is located in close proximity to a POS terminal and has a detection field configured to detect the presence of an item for sale being placed in a shopping cart, on a conveyor belt, or other designated area for placement of items for sale that the customer wishes to purchase. These designated areas are preferably upstream on a path of motion of the item downstream towards the POS terminal. Thus, in one illustrative embodiment, the placement of the item identification system and configuration of the detection field is such that the item is identified prior to the item being scanned for purchase by the POS terminal such that the information about the item may be retrieved by the POS terminal prior to scanning of the item for purchase. It should be appreciated that at a particular business location, there may be a plurality of POS terminals and their associated item identification systems.

In one illustrative embodiment, in response to the item identification system identifying an item being placed in the designated area, the item identification is transmitted by the item identification system to a business location central server and storage system. This business location central server and storage system is centralized for the business location and may service a plurality of POS terminals at the business location. The business location central server and storage system may store a cache of item information for items that have been detected by the item identification systems associated with the plurality of POS terminals within a predetermined time period prior to the current time. The item information may be item information retrieved from the cloud in response to an item identification system identifying an item for which the cache in the business location central server and storage system does not currently have valid item information.

That is, when an item is identified by the item identification system and the item identifier is sent to the business location central server and storage system, the cache of the business location central server and storage system is searched for a valid entry corresponding to the item identifier. If one exists, then the item information is retrieved from the cache and provided to the POS terminal associated with the item identification system that submitted the item identifier. If a valid entry for the item identifier is not present in the cache, then a request for the item information is transmitted from the business location central server and storage system to the cloud system. The cloud system responds with the most recent version of the item information which is then stored in the cache and provided to the POS terminal associated with the item identifier system that submitted the item identifier to the business location central server and storage system.

In this manner, the PUS terminals may quickly retrieve item information prior to the actual scanning of the item by the PUS terminal for purposes of customer purchase. This item information may be stored in a cloud system and portions of this item information may be cached at the local business locations for use by that business location's POS terminals. In this way, item information may be updated or kept current via the cloud system which in turn distributes this item information to the various business locations in response to items being identified by item identification systems present at the various business locations. The result is a POS system that can take advantage of cloud services for storing item information and providing that item information to a plurality of business locations, while avoiding delays due to remote retrieval of the item information from the cloud system.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
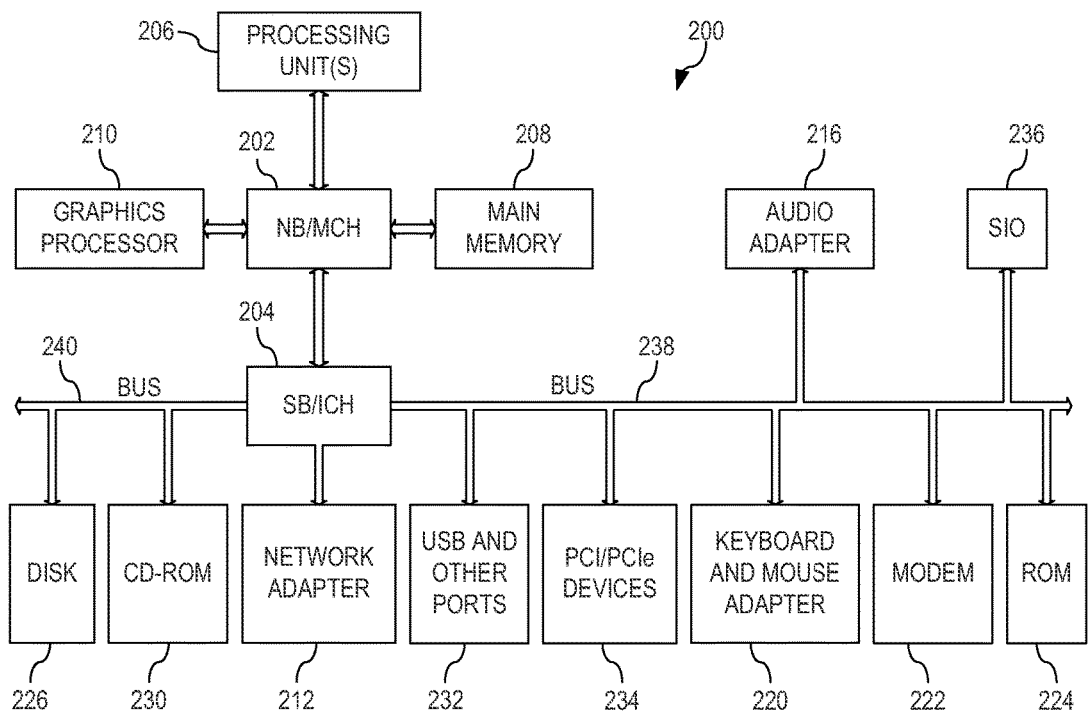
FIG. 2 is an example block diagram of a computing system/device in which aspects of the illustrative embodiments may be implemented.

Thus, aspects of the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX™ operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, one or more of the servers 104, 106, and storage unit 108, as well as other servers, storage units/devices, and the like (not shown) may together constitute a cloud system in which item information for items that are for sale by a business organization may be stored. Clients 110-114 may be clients to the servers 104, 106, storage unit 108, etc., but in themselves may actually be server computing devices, client computing devices, or the like. The clients 110-114 may be business location central server and storage systems, for example, for a plurality of different business locations of the business organization. Moreover, one or more of the clients 110-114 may be a business system administrator or other authorized user workstation which may be used to update the item information stored in the cloud system. Thus, as will be described hereafter, item information may be maintained in the cloud system which may then be distributed to the clients 110-114 via the network 102 so that all of the clients 110-114 have the same item information available to them without having to store the entire catalog of item information in local storage systems associated with the clients 110-114. In order to increase the responsiveness of point-of-sale (POS) systems associated with the clients 110-114, the clients 110-114 may cache the item information that is most recently used by these POS systems. The cached item information may be periodically invalidated and/or overwritten so as to ensure that valid item information is stored in the caches of the clients 110-114 and that the item information is item information actually used by the POS systems.

Figure 3:
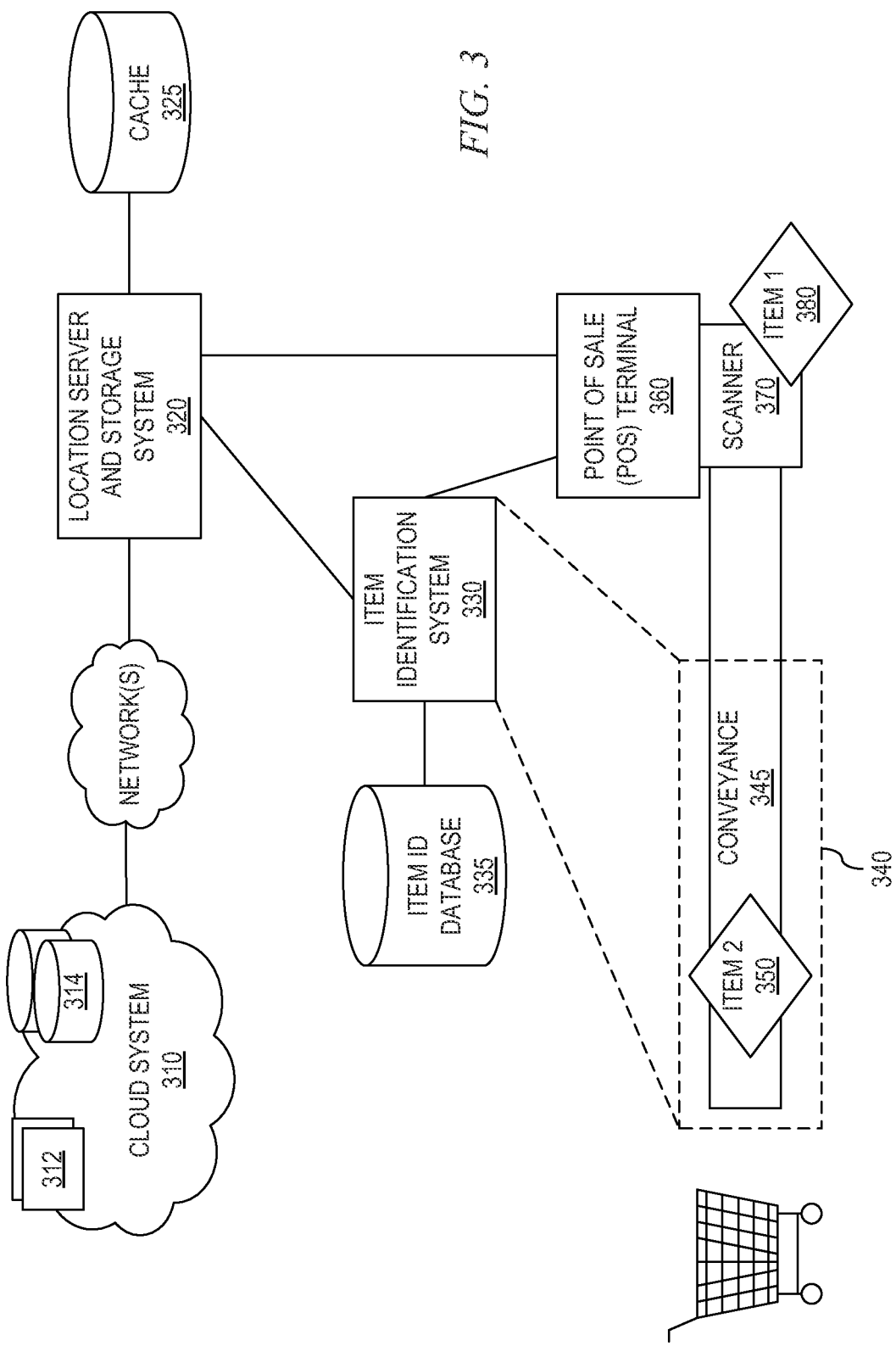
FIG. 3 is provided as an example of a business location server and storage system and its associated point of sale and item identification systems in accordance with one illustrative embodiment.

To better understand the mechanisms of the illustrative embodiments, FIG. 3 is provided as an example of a business location server and storage system and its associated point of sale and item identification systems in accordance with one illustrative embodiment. The various computing systems shown in FIG. 3 may take the form of the computing system shown in FIG. 2 above, for example, or other computing system architecture capable of performing the operations described hereafter. The depiction in FIG. 3 is only exemplary and is not intended to state or imply any limitation with regard to the particular types of computing devices that may be used, the particular configurations of these computing systems, the particular connections between these computing systems, or the like. Many modifications may be made to the example depicted in FIG. 3 without departing from the spirit and scope of the illustrative embodiments.

As shown in FIG. 3, the business location system 300 comprises a location server and storage system 320, an item identification system 330, an optional item conveyance mechanism 340, a point of sale (POS) terminal 360, and an item scanner 370. The location server and storage system 320 is coupled to a cloud system 310 which provides cloud services to the location server and storage system 320. This coupling may be established by wired and/or wireless communication connections to computing devices of one or more data networks 316. It should be noted that while only a single business location system 300 is depicted in FIG. 3, in large organizations there may be multiple business location systems 300 provided at various geographical locations that may all be coupled to the cloud system 310 such that all of the business location systems 300 may access the same catalog of item information stored in the cloud system 310.

The cloud system 310 itself is comprised of one or more servers 312 and/or one or more storage systems 314, which may be the servers 104, 106 and/or storage unit 108 in FIG. 1, for example. The cloud system 310 provides cloud services for storing and distributing item information, from a catalog of item information maintained by the cloud system 310, to the location server and storage systems 320 of the various business locations. The item information distributed to the location server and storage system 320 is a subset of the catalog of item information that is pertinent to the particular items being purchased at the various business locations. Thus, while the catalog of item information that is used as a basis for distributing item information to all of the business locations' location server and storage systems 320 is the same for all of the business locations, the individual subsets of the item information distributed to the various business locations may be different based on the particular items being purchased at these various business locations.

The item information may comprise any item information determined to be of importance during business transactions at a point of sale (POS) terminal 360 at the business location. For example, the item information may comprise item identification information, item price information (which may be tailored to geographical location, e.g., one location may have a higher price than another location due to various factors including governmental regulations, shipping costs, etc.), item description, item photos, images or the like, discount information, coupon information, and the like. Other types of item information may be used with the mechanisms of the illustrative embodiments, as determined pertinent to the particular implementation, without departing from the spirit and scope of the illustrative embodiments.

The item identification system 330 is positioned and configured such that the item identification system 330 identifies items placed within a detection field 340 prior to the item arriving at the POS terminal 360 and its associated scanner 370 for scanning and entry into a transaction. The item identification system 330 may take many different forms including a visual recognition (VR) system, a bar code scanner system, a radio frequency identifier (RFID) reader, or any other known or later developed item identification system. One example of a visual recognition (VR) system that can be used with the mechanisms of the illustrative embodiments is described in U.S. Pat. No. 5,649,070, issued to International Business Machines Corporation of Armonk, N.Y. With this mechanism, objects of a same type are identified visually and categorized together even if there are some differences in appearance, e.g., vegetables may vary in color depending on their degree of ripeness. Other examples of visual recognition system with which the illustrative embodiments may be implemented are described in U.S. Patent Application Publication No. 2010/0217678 and U.S. Pat. No. 5,497,314. It should be appreciated that these are only examples and the illustrative embodiments may be used with any known or later developed visual recognition system without departing from the spirit and scope of the illustrative embodiments.

In response to an item being placed within the detection field 340, the item identification system 330 detects the presence of the item and furthermore, determines an identification of the item based on identification information stored in the identification database 335 associated with the identification system 330. For example, the item identification system 330 may utilize a visual recognition algorithm for detecting the dimensions, colors, labels, or other identifying dimensions, images, or the like, of the item and then compare them to corresponding stored information for various recognizable items stored in the identification database 335. A degree of matching may be determined and based on the degree of matching, one or more thresholds of required degrees of matching, or the like, a particular item identification may be generated or an item identification as to a family of items may be determined by the item identification system 330. This item identification information may be communicated to the location server and storage system 320.

The location server and storage system 320 receives the item identification information, e.g., RFID tag identifier, bar code number, item identification number, item family designation, or the like, and searches a local cache 325 to determine if valid item information is currently present in the cache 325. That is, the location server and storage system 320 compares the item identification information to item identification information stored in entries within the cache 325 to determine if there is an entry with a matching item identification information. If there is an entry that has a matching item identification information, then a determination is made as to whether that entry is valid or not. If the entry is valid, then the item information in the entry is returned to the location server and storage system 320 as valid item information which may then be transmitted to the point of sale terminal 360 for use in performing the transaction. If the entry is not valid, or no entry having a matching item identification information is identified in the cache 325, then the location server and storage system 320 may send a request for the item information to the cloud system 310, as described hereafter.

Periodically, the location server and storage system 320 may invalidate entries in the cache 325 that are determined to be "stale." That is, each entry in the cache 325 may have an associated timestamp that indicates the time that the entry was created in the cache 325. The location server and storage system 320 may compare the timestamps of the various entries in the cache 325 to a current time and determine whether the difference between the two is equal to or greater than a threshold value. If the difference between the timestamp of an entry and the current time is equal to or greater than the threshold, it may be determined that the entry in the cache 325 is "stale" and thus, may not contain the most up-to-date item information. As a result, the entry in the cache 325 may be marked as invalid, such as by setting a valid bit in the entry in the cache 325. As a result, when a next request for item information, having an item identifier information matching this invalid entry, is received by the location server and storage system 320, rather than returning the item information from the invalid entry in the cache 325, the location server and storage system 320 may instead send a request to the cloud system 310 for the most up-to-date item information which may then be received by the location server and storage system 320 and written to the cache 325.

The cache 325 may be implemented in many different ways according to any known or later developed data caching mechanism. In one illustrative embodiment, the cache 325 implements a first-in-first-out caching mechanism where entries are written to the cache 325 until an end of the cache 325 is encountered at which time the writing of entries wraps to a first entry in the cache 325. In other illustrative embodiments, a least recently used (LRU) type of cache 325 may be utilized in which, when a new entry must be written to the cache 325, a least recently used entry in the cache 325 is overwritten with the new entry. Other types of caching mechanisms may be used without departing from the spirit and scope of the illustrative embodiments.

It should be appreciated that, although not explicitly shown in FIG. 3, the POS terminals 360 themselves may have a relatively smaller cache for storing item information for items specifically detected by the item identification system 330 associated with that POS terminal 360 for a current transaction. Thus, for example, if a customer is involved in a transaction where the customer intends to purchase more than one of a same item, the POS terminal 360 may cache the item information for this item in its own smaller cache for quicker retrieval. In such a case, the item identification information obtained from the item identification system 330 may first be checked with the item information entries in the POS terminal 360 cache and if a matching entry is not found there, a check of the cache 325 by the location server and storage system 320 may be performed in the manner previously described above.

As touched upon above, if the cache 325 does not have a valid entry having a matching item identification information to that of a request sent from the item identification system 330, then the location server and storage system 320 sends a request for the most recent item information to the cloud system 310. The request may be sent from the location server storage system 320 to the cloud system 310 via at least one of a wired and/or wireless communication link with one or more data networks. The data networks may include local area networks, wide area networks, the Internet, cellular networks, satellite networks, or any other wired and/or wireless communication network known or later developed.

The cloud system 310 comprises one or more servers 312 and/or one or more storage systems 314 for storing item information for the various items that may be detected by the item identification system 330. The request sent by the location server and storage system 320 may comprise the item identification information, an identification of the location server and storage system 320 to which the item information is to be returned, an identification of the POS terminal 360 to which to send the item information once it is returned, and/or the like.

In response to receiving the request from the location server and storage system 320, one or more of the server(s) 312 and/or storage system(s) 314 may search their stored item information to determine if item information for an item having the item identification information is present. In response to a determination that item information exists for the item identification information received in the request, the corresponding server/storage system 312/314 returns the corresponding item information to the location server and storage system 320 identified in the request. Preferably, the cloud system 310 stores only one copy of valid item information so that conflicts between server(s) 312 and/or storage system(s) 314 do not occur. However, in an embodiment in which a plurality of server(s) 312 and/or storage system(s) 314 may each store what they believe to be valid item information for a particular item, a mechanism may be provided in the server(s) 312 and/or storage system(s) 314, or even the location server and storage system 320, for determining which item information is the most recent and up-to-date item information to be returned to or utilized by the location server and storage system 320. For example, timestamp information associated with the item information may be compared to determine which item information for the item is the most recent or up-to-date item information.

The item information stored in the cloud system 310 may be updated periodically by system administrators or other authorized personnel via one or more administrator workstations 302-304 that are in communication with the cloud system 310 via one or more wired and/or wireless communication links and one or more data networks. In this way, only one copy of the item information needs to be managed by system administrators, and this one copy is present within the cloud system 310. Thereafter, this item information is made available to a plurality of different business locations via the on-demand mechanism for caching such item information as described previously. It should be appreciated that while in one embodiment the updating and maintaining of the item information up-to-date is performed by system administrators, in other illustrative embodiments, automated mechanisms may be used either in replacement of, or in addition to, system administrator operations so as to update and maintain the item information as up-to-date to current conditions, item offerings, pricing, and the like, of the business organization.

The item information is transmitted from the cloud system 310 to the location server storage system 320 which may then store the item information in the cache 325 and provide the item information to the POS terminal 360. Since the item identification system 330 is positioned and configured to detect the presence and type of the item 350 at an early stage prior to the item arriving at the scanner 370 associated with the POS terminal 360, the retrieval of item information either from the cache of the PUS terminal 360, the cache 325 associated with the location server and storage system 320, or from the cloud system 310, is performed with sufficient time that the item information is available at the POS terminal 360 prior to or upon the item 350 arriving at the scanner 370. For example, if the item 350 is placed on a conveyance 345, such as a shopping lane conveyor belt or the like, by the time the item 350 reaches the end of the conveyance 345, the item information should be retrieved and made available to the POS terminal 360. The item 350 may be scanned by the scanner 370 and its corresponding item identification information as determined by the scanner 370 may be correlated by the POS terminal with the item information retrieved from the cache of the POS terminal, the cache 325, or the cloud system 310. Thus, for example, while item 1 380 is being scanned by the scanner 370 of the POS terminal 360, and being processed by the POS terminal 360 as part of the transaction between the business location and the customer, item 2 is being detected and identified by the item identification system 330 and the corresponding item information is being retrieved. Thus, a constant sequence of scanning, detecting, and identifying of items is made possible with little, if any, delay in waiting for item information to be retrieved.

Based on the item information retrieved, and the scanning of the item 350 by the scanner 370, the transaction may be conducted between the customer and the business location. The item information is processed by the POS terminal 360 to determine appropriate actions to be performed as part of the transaction. For example, the item information may include pricing information, discount information, coupon information, and/or the like. The pricing information may be used to update a total amount for the transaction. The discount and coupon information may comprise conditions (e.g., required quantities, required other items that must be purchased as part of the same transaction, discount card presentation requirements, etc.) that must be present for the discount or coupon to take effect on the current transaction. The POS terminal 360 may process this information along with other information regarding the transaction to determine if the discount or coupon applies and may further process this information to determine if any conflicts are present between discounts and coupons and to determine which discount or coupon is most beneficial to the customer during the current transaction. Any type of processing of the transaction and item information may be used with the mechanisms of the illustrative embodiments without departing from the spirit and scope of the illustrative embodiments. The POS terminal 360 may then be used to complete the transaction.

It should be appreciated that while the above illustrative embodiments have been described in terms of a business location utilizing a location server and storage system 320 for communicating with the cloud system 310, the illustrative embodiments are not limited to such. Rather, the mechanisms and functionality of the location server storage system 320 and cache 325 may be integrated into the POS terminal 360, for example, such that the POS terminal 360 may communicate with the cloud system 310 to obtain valid item information for items detected and identified by the item identification system 330 prior to the items arriving at the scanner 370 associated with the POS terminal 360. In such an embodiment, the POS terminal 360 may cache the most recently used item information in its own cache 325 and may perform the various functions of the location server and storage system 320 with regard to checking the cache 325 for valid item information, sending requests to the cloud system 310 for item information, and the like. As noted above, a business location may have multiple POS terminals 360 and, in this illustrative embodiment, each of the POS terminals 360 may have their own separate cache 325 and corresponding logic for implementing the functionality of the location server and storage system 320.

Furthermore, it should be appreciated that while the illustrative embodiments are described in terms of a commercial transaction between a customer and a business location, the illustrative embodiments are not limited to such. Rather, the illustrative embodiments may be implemented in any situation where physical items are scanned for processing information about the items. For example, another implementation of the illustrative embodiments may be provided in which the mechanisms described above are used for inventory purposes. That is, rather than being part of a commercial transaction, the scanning, detection of items, retrieval of item information, and the like, may be performed to generate an inventory listing for an organization. Moreover, the organization may be another type of organization other than a business organization, e.g., a governmental organization or the like, that may or may not be involved in commercial transactions.

It should further be appreciated that while the illustrative embodiments are described in terms of the item identification system 330 being in close proximity to the POS terminal 360, the illustrative embodiments are not limited to such. Rather, other item identification systems 335 that are not in close proximity to the POS terminal 360 but otherwise in communication with the POS terminal 360 and/or the location server and storage system 320 may be used without departing from the spirit and scope of the illustrative embodiments. For example, a hand-held scanner mechanism, a shopping cart scanner mechanism, or the like, may be provided at a location distant from the POS terminal 360 but in wired and/or wireless communication with one or more of the location server and storage system 320 and/or the PUS terminal 360. Any type of item identification system 330 may be used without departing from the spirit and scope of the illustrative embodiments.

Thus, the illustrative embodiments provide mechanisms for storing item information in a cloud computing system and caching portions of the item information at a business location for quicker retrieval by POS terminals 360 at the business location. As a result, the cloud computing system provides a mechanism for simplified maintenance and updating of item information with subsequent retrieval by one or more locations on an on-demand basis as items are detected as being present in close proximity to a POS terminal 360 at the locations.

Figure 4:
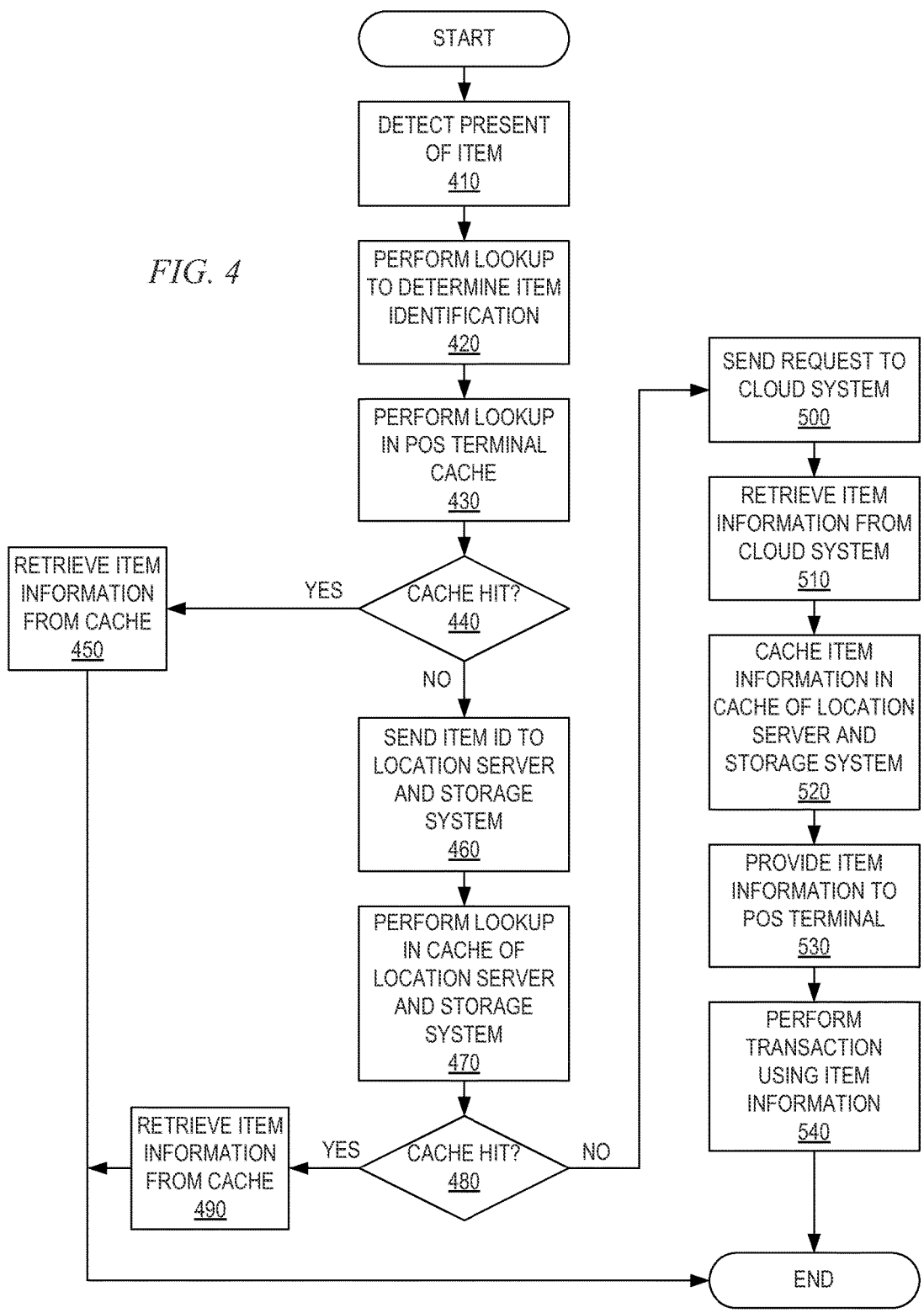
FIG. 4 is a flowchart outlining an example operation for retrieving item information in accordance with one illustrative embodiment.

FIG. 4 is a flowchart outlining an example operation for retrieving item information in accordance with one illustrative embodiment. The operation outlined in FIG. 4 may be implemented, for example, by a business location system 300. The operation outlined in FIG. 4 may be implemented as instructions executed by one or more processors of one or more computing devices of the business location system 300, for example. Such instructions may be loaded into a memory, firmware, or the like, of these one or more computing devices from another type of media, such as a CD-ROM, DVD-ROM, flash memory device, floppy disk, downloaded from a data network, or the like.

As shown in FIG. 4, the operation starts by detecting the presence of an item in a detection field of an item identification system (step 410). Detected information from the item is used to perform a lookup operation in an item identification database to determine item identification information (step 420). Optionally, the item identification information is used to perform a lookup operation in a cache of a POS terminal associated with the item identification system (step 430). A determination is made as to whether a cache hit occurs, i.e. a valid entry in the POS terminal's cache is detected (step 440). If so, the item information is retrieved from the cache and provided to the POS terminal to complete the transaction (step 450). If a valid entry is not present in the POS terminal's cache, then the item identifier information is provided to a business location server and storage system (step 460) and a lookup operation is performed in a cache associated with the business location server and storage system to determine if a valid entry for the item is present (step 470).

If a valid cache entry is present in the cache associated with the business location server and storage system, i.e. a cache hit occurs (step 480), the item information is retrieved from the cache and provided to the POS terminal to complete the transaction (step 490). If a valid entry is not present in the POS terminal's cache, then a request is sent to a remotely located cloud system for the item information (step 500). The item information is received from the cloud system (step 510), is cached in the business location server and storage system (step 520), and provided to the POS terminal for completion of the transaction (step 530). Processing of the item information is performed so as to complete the transaction (step 540). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for retrieving and utilizing item information to perform a transaction, comprising:
    receiving, by the data processing system, an identification of an item present in a detection field of the item identification system, wherein the detection field of the item identification system is located physically upstream on a path of motion of the item downstream towards a scanner associated with a point of sale device;
    determining, by the data processing system, if valid item information for the item is present in a cache of the data processing system in response to detecting the item as being present in the detection field of the item identification system;
    retrieving, by the data processing system, prior to the item reaching the point of sale device and being scanned by the scanner associated with the point of sale device, the valid item information from the cache in response to the valid item information for the item being determined to be present in the cache of the data processing system;
    retrieving, by the data processing system, prior to the item reaching the point of sale device and being scanned by the scanner associated with the point of sale device, the valid item information from a remotely located cloud computing system in response to a determination that valid item information is not present in the cache; and
    performing, by the data processing system, in response to the item being scanned by the scanner associated with the point of sale device, and subsequent to retrieval of the valid item information from one of the cache of the data processing system or the remotely located cloud computing system, the transaction based on the valid item information.

2. The method of claim 1, wherein the item identification system is a visual recognition system that identifies items placed within the detection field based on their visual characteristics, and wherein the detection field of the item identification system is at an opposite end of a conveyor belt, upon which the item is placed and along which the item's path of motion traverses, from the detection field to the scanner associated with the point of sale device.

3. The method of claim 1, wherein the cache is a cache of a point of sale device coupled to the item identification system, and wherein the method further comprises:
    in response to the valid item information not being present in the cache, requesting the valid item information from a centralized business location computing system servicing a plurality of point of sale devices at a same business location, wherein in response to the valid item information not being present in the centralized business location computing system, the valid item information is retrieved from the remotely located cloud computing system.

4. The method of claim 1, wherein the data processing system is a centralized business location computing system that services a plurality of point of sale terminals at a business location.

5. The method of claim 4, wherein the cloud computing system services a plurality of centralized business location computing systems by providing valid item information to each of the plurality of centralized business location computing systems.

6. The method of claim 1, wherein the valid item information comprises at least one of item price information, item description information, item photo or image information, item discount information, or item coupon information.

7. The method of claim 1, wherein the cache stores a subset of valid item information, from a full set of valid item information stored in the cloud computing system, wherein the subset of valid item information comprises valid item information for items detected, within a predetermined period of time, by one or more item identification systems associated with a plurality of point of sale devices associated with the data processing system.

8. The method of claim 7, wherein each point of sale device in the plurality of point of sale (POS) devices have associated POS caches that store a transaction subset of valid item information, which is a subset of the subset of valid item information, for items identified by an item identification system associated with that particular POS device within the predetermined period of time, and wherein item information in the subset of valid item information stored in the POS caches is invalidated when the item information is determined to be older than the predetermined period of time.

9. A system, comprising:
    an item identification system; and
    a data processing system coupled to the item identification system, wherein:

the item identification system is configured to detect an item present in a detection field of the item identification system, wherein the detection field of the item identification system is located physically upstream on a path of motion of the item downstream towards a scanner associated with a point of sale device; and the data processing system is configured to:

determine if valid item information for the item is present in a cache of the data processing system in response to detecting the item as being present in the detection field of the item identification system;

retrieve, prior to the item reaching the point of sale device and being scanned by the scanner associated with the point of sale device, the valid item information from the cache in response to the valid item information for the item being determined to be present in the cache of the data processing system;

retrieve, prior to the item reaching the point of sale device and being scanned by the scanner associated with the point of sale device, the valid item information from a remotely located cloud computing system in response to a determination that valid item information is not present in the cache; and perform, in response to the item being scanned by the scanner associated with the point of sale device, and subsequent to retrieval of the valid item information from one of the cache of the data processing system or the remotely located cloud computing system, the transaction based on the valid item information.

10. The system of claim 9, wherein the item identification system is a visual recognition system that identifies items placed within the detection field based on their visual characteristics, and wherein the detection field of the item identification system is at an opposite end of a conveyor belt, upon which the item is placed and along which the item's path of motion traverses, from the detection field to the scanner associated with the point of sale device.

11. The system of claim 9, wherein the cache is a cache of a point of sale device coupled to the item identification system, and wherein the data processing system is further configured to:

request, in response to the valid item information not being present in the cache, the valid item information from a centralized business location computing system servicing a plurality of point of sale devices at a same business location, wherein in response to the valid item information not being present in the centralized business location computing system, the valid item information is retrieved from the remotely located cloud computing system.

12. The system of claim 9, wherein the data processing system is a centralized business location computing system that services a plurality of point of sale terminals at a business location, and wherein the cloud computing system services a plurality of centralized business location computing systems by providing valid item information to each of the plurality of centralized business location computing systems.

13. The system of claim 9, wherein the valid item information comprises at least one of item price information, item description information, item photo or image information, item discount information, or item coupon information.

14. The system of claim 9, wherein the cache stores a subset of valid item information, from a full set of valid item information stored in the cloud computing system, wherein the subset of valid item information comprises valid item information for items detected, within a predetermined period of time, by one or more item identification systems associated with a plurality of point of sale devices associated with the data processing system.

15. The system of claim 14, wherein each point of sale device in the plurality of point of sale (POS) devices have associated POS caches that store a transaction subset of valid item information, which is a subset of the subset of valid item information, for items identified by an item identification system associated with that particular POS device within the predetermined period of time, and wherein item information in the subset of valid item information stored in the POS caches is invalidated when the item information is determined to be older than the predetermined period of time.

16. A computer program product comprising a computer readable storage medium having a computer readable program stored therein, wherein the computer readable program, when executed on a data processing system, causes the data processing system to:

receive an identification of an item present in a detection field of the item identification system, wherein the detection field of the item identification system is located physically upstream on a path of motion of the item downstream towards a scanner associated with a point of sale device;

determine if valid item information for the item is present in a cache of the data processing system in response to detecting the item as being present in the detection field of the item identification system;

retrieve, prior to the item reaching the point of sale device and being scanned by the scanner associated with the point of sale device, the valid item information from the cache in response to the valid item information for the item being determined to be present in the cache of the data processing system;

retrieve, prior to the item reaching the point of sale device and being scanned by the scanner associated with the point of sale device, the valid item information from a remotely located cloud computing system in response to a determination that valid item information is not present in the cache; and perform, in response to the item being scanned by the scanner associated with the point of sale device, and subsequent to retrieval of the valid item information from one of the cache of the data processing system or the remotely located cloud computing system, the transaction based on the valid item information.

* * * * *